Patented Jan. 10, 1933

1,894,184

UNITED STATES PATENT OFFICE

CHAUNCEY C. LOOMIS, OF LENOX, MASSACHUSETTS

TREATMENT OF DOLOMITIC STONE

No Drawing. Application filed November 10, 1930. Serial No. 494,814.

The present invention relates to the treatment of dolomitic stone to obtain therefrom magnesium oxide or products which contain magnesium oxide, and it has to do particularly with a novel process for producing from stone of this character a product which consists principally of magnesium oxide and calcium carbonate and which is free from objectionably large amounts of calcium oxide.

Dolomite is a relatively abundant and widely occurring natural carbonate of calcium and magnesium and is essentially a calcium-magnesium limestone which, upon heating or burning at relatively high temperatures, loses carbon dioxide and leaves a residue consisting principally of the oxides of calcium and magnesium. Dolomitic stone is extensively used commercially as a raw material in the manufacture of lime.

Magnesium oxide is a relatively valuable and high priced product as compared, for instance, with lime. Besides having a number of specific uses in chemical, medicinal and similar fields, magnesium oxide is important in the building industry. Magnesium oxychloride cements, the active ingredients of which are magnesium oxide and magnesium chloride, have achieved a considerable importance in the building industry, being used in flooring, stuccoes, interior wall coatings, and many other items of construction. Magnesium oxide for use in magnesium oxychloride cements is commonly obtained by calcining magnesite, a magnesium carbonate rock, or by suitably treating certain natural brines which contain salts of magnesium. Magnesium oxide obtained from these sources is relatively expensive due largely to the rarity of the deposits of magnesite and other suitable raw material, to the inconvenient geographical locations of these deposits, or to the expense of processing certain of the raw materials and recovering magnesium oxide therefrom in suitable condition free from objectionable impurities.

The production of magnesium oxide and of magnesium oxide-containing products from dolomite has been proposed heretofore. It is known, as a matter of theory, that a carefully controlled burning or calcining of dolomitic stone can be utilized to effect a selective decomposition wherein the magnesium carbonate is decomposed to form magnesium oxide while the calcium carbonate remains substantially unchanged. This operation is based on the fact that magnesium carbonate decomposes and gives up carbon dioxide at somewhat lower temperatures than does calcium carbonate. The proposed production of magnesium oxide by selectively calcining dolomite in the manner indicated just above has not, as far as I am aware, attained any commercial success or importance. Proposed processes of this kind have been predicated upon careful and accurate temperature control throughout every part of the material under treatment during the entire calcining operation. No flame or fire is permitted to come into direct contact with the stone under treatment due to the danger of local overheating and consequent formation of calcium oxide. The stone to be treated is finely ground or pulverized before calcining in order that each particle of the stone can be quickly heated through without any substantial temperature difference between the outside and the inside of the particles of stone, this being done in an effort to prevent heating of the outer surfaces of the particles of the stone to such an extent that calcium oxide is formed. Expensive and complicated indirect fired kilns and apparatus have been proposed for the purpose of avoiding direct contact between the stone under treatment and the fire and for the purpose of effecting uniform heating throughout the mass of material. The operation is so critical that the production of a product, in commercial quantities, reasonably free from calcium oxide is substantially impossible and, even if a reasonably good product could be produced, the expense of equipment, the cost of processing and the minute attention required for operating control make the process impracticable for relatively large scale commercial production.

The extremely careful and accurate control upon which proposed operations of the kind above referred to are predicated is intended to avoid the production of any substantial proportion of calcium oxide in the finished calcined product. Calcium oxide produces very pronounced objectionable effects when present in magnesium oxychloride cement even in small quantities, the most objectionable of these adverse effects being excessive expansion of the cement after setting and loss of strength. When calcium oxide is present, a chemical reaction takes place between the calcium oxide, the magnesium chloride and the water, forming magnesium hydrate and calcium chloride. It appears, therefore, that the abnormal expansion which is caused by the presence of lime or its compounds in magnesia used in oxychloride cements is due to the calcium chloride which is formed. The presence of active lime; i. e., free lime which will react chemically with magnesium chloride solution is a detriment to the finished cement, particularly in the matter of abnormal expansion of the cement after setting, and should therefore be avoided insofar as practicable.

It is an object of the present invention to provide a novel process for treating dolomite, or similar stone, to obtain therefrom a product consisting chiefly of magnesium oxide and calcium carbonate free from objectionably large amounts of lime, which process does not require particularly careful operating control, does not require special or expensive equipment, and does not require a costly preparation of the raw material for treatment. The equipment required, the care necessary in processing the material, and the preparation of the stone for treatment involve substantially nothing more extensive or exacting than the ordinary operations of lime manufacture. The process of this invention is adapted for large scale production, can be conducted at a very low cost substantially comparable with the cost of producing lime, can be conducted largely in the same equipment used for lime making and can be operated by the ordinary class of labor found in the average lime plant.

The present invention is in part predicated on the discovery that, when dolomitic stone is calcined, as in an ordinary lime kiln, with the stone in fairly large pieces, the calcining action can be arrested after the outer portions of the stone have been completely burned to form calcium oxide and magnesium oxide but before the inner portions of the stones have been sufficiently burned to form calcium oxide. When the calcining action is conducted as just described, the stones discharged from the kiln exhibit an outer layer of completely burned material and an inner portion or core wherein the calcium carbonate has not been decomposed. There is a sharp and definite line of demarcation between the completely burned and the partially burned portions of the stone. If a stone which has been partially burned as just described be split in two, the aforesaid sharp line of division is distinctly visible in the stone. The outer or completely burned portion of the stone is of lighter color than the inner core or partially burned portion. The lighter outer portion does not shade gradually into the darker core, but rather stops abruptly immediately adjacent the darker core so that a sharp dividing line between the two portions of the stone is distinctly visible. No transitional area between the two portions is discernible.

Chemically the two portions of the partly calcined stone are different, and the line of demarcation as to chemical composition between the two portions of the stone is just as well-defined and just as abrupt as is the visual indication. Large numbers of analyses have established that the outer lighter colored layer contains calcium oxide and magnesium oxide and does not contain any substantial quantity of calcium carbonate or magnesium carbonate. Similar analyses have shown that the inner, darker colored core contains magnesium oxide and calcium carbonate and does not contain calcium oxide or magnesium carbonate in appreciable quantity. The results just stated are obtained even when the respective portions of the stone are sampled immediately adjacent the aforesaid dividing line. The line of demarcation between the two portions is sharp and definite without any measureable region wherein a partial state of decomposition exists characterized by the presence of appreciable quantities of both calcium carbonate and calcium oxide in the same part of the stone. The decomposition of the calcium carbonate to form calcium oxide appears to proceed gradually inwardly during the calcining operation and, if this decomposition be arrested at any point before it has penetrated to the center of the stone, the above described condition is attained.

In the operation of the process of this invention, an ordinary lime kiln is preferably used. The kiln is charged in the usual manner with dolomitic stone broken up into chunks of such size as desired, ordinarily fairly large pieces averaging say one hundred pounds each. Smaller or larger stones may be charged to the kiln as desired, but a granulated or pulverized condition of the stone is to be avoided; the success and commercial practicability of the invention depend to a certain extent upon the presence of stones of fairly large size in the kiln. The kiln is preferably fired and operated according to the usual practice in the production of lime, except that it is operated at a somewhat lower temperature level so that only a relatively thin layer or portion at the outer surfaces of the stones is burned to such extent that calcium oxide is formed or, if operated at ordinary temperatures, the material is drawn more rapidly so that insufficient time for complete burning is allowed. In the preferred operation, the kiln is operated so as to burn as small an amount of the stone to calcium oxide as can conveniently be done. The temperature in the kiln and the time during which the stones are subjected to treatment are regulated in the usual manner and are controlled approximately to attain the conditions just stated. It will be understood that the burning of a greater or lesser amount of the stone to the point where calcium oxide is produced does not affect the quality of the ultimate product, and the only reason for regulating conditions to thus completely burn as small a proportion of the stone as possible is to increase the production of the desired magnesium oxide-calcium carbonate product and to reduce the amount of lime which must be separated from the product in the manner described below. As a matter of practical operation it has been found that when stones of the size indicated above are burned to such extent that calcium oxide is formed at the exterior surfaces of the stone, the magnesium carbonate throughout the entire body of the stone is substantially completely decomposed to form magnesium oxide. Hence, the only operating control necessary to be observed by the kiln operator is to conduct his burning so that he produces a thin layer at the outer surfaces of the stone which is substantially completely burned to calcium oxide and magnesium oxide. The operator can readily check the operation of the kiln by occasionally splitting open a stone discharged from the kiln and noting the location of the sharp line which marks the division between the completely burned and the partially burned portions of the stone.

I have found that the outer layer of calcium oxide and magnesium oxide which is formed on the stones, in the process conducted as above described, can be separated and removed from the inner core of magnesium oxide and calcium carbonate in various ways. The stones, upon removal from the kiln, are preferably subjected to a slaking operation. For instance, the stones discharged from the kiln may be stored for a few days in a moist atmosphere, during which time the outer layer of completely burned stone air slakes and becomes soft and crumbly. The slaked outer layer can be loosened and removed manually or by tumbling the stones in any suitable form of power driven apparatus. Any lime which still clings to the cores can be washed off, leaving a clean core of magnesium oxide and calcium carbonate.

Probably the easiest, quickest and preferable way to effect removal of calcium oxide containing material from the calcined stones in commercial operation is by water slaking. The stones discharged from the kiln are hard and can be handled readily without dusting or breaking. If these stones are placed in water or if water is sprayed onto the stones, the outer calcium oxide containing layer or portions of the stones slakes with great rapidity, and these portions of the stone soften, expand and crumble off of the inner core portion in the space of a very few minutes. In a preferred form of operation the stones discharged from the kiln are placed on a suitable traveling conveyor and are passed under the action of water sprays. As soon as the stones come under the action of the water the completely burned outer portions of the stones quickly slake and crumble off as above described, and this action continues until substantially all of the calcium oxide containing material is removed. The sludge resulting from this slaking operation passes through the conveyor and drops into a collecting vat from whence it is transferred to the hydrated lime department of the plant and can be worked in as a part of the hydrated lime production. The treatment of the stones under the water sprays is regulated by controlling the speed of the conveyor, the distance of travel over which water is supplied, and the rate at which water is supplied so that the stones are thoroughly washed and cleaned of substantially all calcium oxide containing material by the time they reach the end of their travel on the conveyor. If desired, the stones can be turned on the conveyor so that all sides of the stones become thoroughly washed, or the stones can be immersed in or passed through a bath of clean running water at the end of their travel to insure complete washing and removal of calcium oxide. The total time required for this washing and removal of the calcium oxide containing portions of the stones occupies only a short time, and the magnesium oxide-calcium carbonate cores or stones are substantially unaffected by the water and remain hard and firm and in condition for easy handling. The washing process, as described above, is practicable from a commercial standpoint and is effective in removing the calcium oxide-containing material sufficiently completely so that the calcium oxide content of the finished product is within permissible limits.

The cores or stones, after having been treated to effect removal of lime as above described, may be ground or pulverized or put to such use as is desired. If they are to be used as a source of magnesium oxide, they are ground up and then subjected to whatever process is employed for the separation of the magnesium oxide from the calcium carbonate. If, for example, the cores are to be used in the manufacture of magnesium oxychloride cements they are broken up, ground and pulverized to a desired fineness, and the pulverized stone is then admixed with magnesium chloride solution according to the usual practice of making magnesia cements. The amount of magnesium chloride is calculated on the amount of magnesium oxide present, the calcium carbonate being regarded as an inert filler. Cements properly made from the magnesium oxide-calcium carbonate material produced by the process of this invention, as described above, possess all of the characteristics of high grade magnesia cements made from magnesium oxide which is derived from magnesite. Cements made from the present product, when combined with other usual ingredients such as silex, sand and such other materials as desired, form excellent flooring materials, stuccoes, interior wall coatings, and the like, which exhibit good qualities both from the standpoint of durability and appearance and offer the possibility of a variety of finishes which may be taken advantage of in the production of artistic effects. Cements made from the present product, if troweled smoothly or if allowed to set against glass take on a hard, glazed, porcelain-like surface which is valuable in many uses. Also, the cements readily take any grain as, for instance, leather, wood; etc., when allowed to set against material having such grain.

It is to be noted particularly that the process of this invention departs entirely from any attempt at selective calcination of the dolomite wherein the temperature is so closely regulated and so uniformly maintained throughout the entire body of the material under treatment as to burn all of the magnesium carbonate to magnesium oxide without burning any of the calcium carbonate to calcium oxide. Observation and experience have demonstrated this to be a practical impossibility in regular commercial manufacture with apparatus and equipment at present available. The present process proceeds directly contrary to this concept and deliberately continues the burning of the product until all of the magnesium carbonate is decomposed to form magnesium oxide, some calcium oxide inevitably being formed in the outer portions of the stones during this operation. The calcium oxide is subsequently separated from the desired product in the manner described above. Thus, the process is relieved of any necessity of minute control. The ordinary variations in temperature, time of treatment, nonuniformity of heating throughout the mass of material under treatment, and the like which are apt to occur in the ordinary operation of a kiln, result only in the burning of a greater or lesser amount of the stone to calcium oxide with a resulting greater or lesser amount of material at the surfaces of the stones which is removed in the washing treatment. Such variations in process conditions have no effect on the quality of the product resulting from the process.

The process, in its embodiment described above, is particularly well adapted for use in a lime plant because of the fact that an ordinary lime kiln can be used for the calcining operation, stone for charging the kiln is taken from the quarry and broken up exactly the same as for the lime kilns, and the hydrated lime from the washing operation can be used in the hydrate department of the lime plant. The process as described herein makes possible the production of a magnesium oxide-calcium carbonate product, free from objectionable amounts of calcium oxide, at a low cost, in large tonnages, and on a thoroughly practicable commercial basis, thus furnishing a principal ingredient for magnesium chloride cements, or furnishing a material from which magnesium oxide can be derived, at a cost very much less than such products have been available heretofore.

The invention comprises broadly the calcining of the stone to form the inner core of magnesium oxide and calcium carbonate separated from the outer completely burned portions of the stone by the sharp and definite line of demarcation, as above described, and the utilization of this form of calcining in an operative process as described above, all as more particularly defined in the claims appended hereto.

I claim:

The process of treating dolomite in the form of large lumps to produce therefrom a magnesium oxide-calcium carbonate product free from objectionably large amounts of calcium oxide, which comprises subjecting the large lumps of dolomite to heat treatment in an ordinary lime kiln but operating the lime kiln at a somewhat lower temperature than one is ordinarily operated thereby effecting a decomposition of substantially all of the magnesium carbonate constituent of the dolomite to form magnesium oxide without effecting a decomposition of the calcium carbonate constituent except a very small percent which occurs in the form of a very thin layer on the exterior surfaces of the dolomite lumps, removing the treated lumps from the heating zone, and separating the inner core of magnesium oxide and calcium carbonate from the outer layer of magnesium oxide and calcium oxide by subjecting the treated lumps to the action of a water spray to thereby slake and wash off the calcium oxide containing layer, said calcium oxide containing layer being of such physical and chemical nature as to readily permit its removal by means of water.

In testimony whereof I affix my signature.

CHAUNCEY C. LOOMIS.